United States Patent
Eitel et al.

(10) Patent No.: US 9,172,430 B2
(45) Date of Patent: Oct. 27, 2015

(54) HIGH PERFORMANCE PLC CLUSTER SYSTEM

(75) Inventors: Ben Eitel, Gärtringen (DE); Andreas Schwager, Waiblingen (DE)

(73) Assignee: SONY Corporation, Tokyo (JP)

( * ) Notice: Subject to any disclaimer, the term of this patent is extended or adjusted under 35 U.S.C. 154(b) by 884 days.

(21) Appl. No.: 13/417,550

(22) Filed: Mar. 12, 2012

(65) Prior Publication Data

US 2012/0300820 A1 Nov. 29, 2012

(30) Foreign Application Priority Data

May 26, 2011 (EP) .................................... 11004349

(51) Int. Cl.
*H02J 1/00* (2006.01)
*H02J 3/00* (2006.01)
*H04B 3/54* (2006.01)

(52) U.S. Cl.
CPC *H04B 3/54* (2013.01); *H04B 3/544* (2013.01); *H04B 2203/5454* (2013.01); *H04B 2203/5491* (2013.01)

(58) Field of Classification Search
CPC ... H04B 3/54; H04B 2203/5445; H04L 25/02
USPC .......................................................... 307/1, 3
See application file for complete search history.

(56) References Cited

U.S. PATENT DOCUMENTS

| | | | |
|---|---|---|---|
| 7,186,146 B1 * | 3/2007 | Chang et al. .................. | 439/650 |
| 2004/0024913 A1 | 2/2004 | Ikeda et al. | |
| 2006/0038660 A1 | 2/2006 | Doumuki et al. | |
| 2007/0120953 A1 * | 5/2007 | Koga et al. ................. | 348/14.01 |
| 2008/0190639 A1 | 8/2008 | Baran et al. | |

FOREIGN PATENT DOCUMENTS

| | | |
|---|---|---|
| EP | 2 200 187 A1 | 6/2010 |
| WO | WO 2011/050902 A1 | 5/2011 |

OTHER PUBLICATIONS

U.S. Appl. No. 13/502,774, filed Jun. 11, 2012, Schwager, et al.
The Extended European Search Report issued Oct. 5, 2012, in Application No. / Patent No. 12000139.1-2411.
Combined Office Action and Search Report issued Jan. 28, 2015 in Chinese Patent Application No. 2012101621556 (submitting English translation only).

* cited by examiner

*Primary Examiner* — Carlos Amaya
(74) *Attorney, Agent, or Firm* — Oblon, McClelland, Maier & Neustadt, L.L.P.

(57) ABSTRACT

A device comprises a power input for supplying an external AC power to the device via a power cord, a filter for filtering noise from the outside out of the supplied external AC power and for thereby generating a filtered AC power, at least one power socket for supplying the filtered AC power to at least one other device, a PLC modem configured to be connected to the at least one power socket and to transmit data to or receive data from the at least one other device via power line communication using the filtered AC power, and a managing means configured to establish a data connection with the at least one other device and to detect whether the at least one other device is capable of PLC functionality. A respective power line communication system and a respective power line communication method are also proposed.

20 Claims, 8 Drawing Sheets

HIGH PERFORMANCE PLC CLUSTER SYSTEM

The invention relates to a device, which may be used in a power line communication system. The invention further relates to corresponding power line communication systems and a power line communication method.

BACKGROUND

Power line communication (PLC), also called mains communication, power line transmission (PLT), broadband power line (BPL), power band or power line networking (PLN), is a term describing a method for using electric power distribution wires for simultaneous distribution of data. A carrier can communicate voice and data by superimposing an analogue signal over the standard 50 Hz or 60 Hz alternating current (AC) of a power network. For indoor applications PLC equipment can use household electrical power wiring as a transmission medium for data transfer.

However, power line communication between devices within a power line communication system may be interfered with by other devices or systems outside the power line communication system but connected to the same electrical power wiring. For example, vacuum cleaners, electric drills, dimmers, electrical ballasts or switching power supplies, which are supplied by the same electrical power network and do not take part in the PLC system or take part in another PLC system, may cause disturbances in the mains power network due to noise generated thereby.

Therefore, other carriers for distributing data, such as HDMI or S-video cables for instance, are used for short distances between devices communicating with each other. This may result in a plurality of cables connecting different communicating devices with each other, which leads to a complex network architecture.

It is an object of the invention to enable a power line communication between a plurality of devices of a power line communication system without interferences from outside the power line communication system. Another object of this invention is to maximize data throughput rates and increase flexibility in usage for a wide range of applications. Another object of this invention is to provide a power line communication system, which renders a complex wiring with additional carriers obsolete and allows a reduced complexity and installation effort compared to common systems. Additional carriers are electrical and/or optical audio cables, composite video cables, S-video cables, SCART cables, HDMI cables, for instance.

The objects are solved by a device, a power line communication system, and a power line communication method as claimed and described herein.

Further embodiments are defined in the dependent claims.

Further details of the invention will become apparent from consideration of the drawings and ensuing description.

DETAILED DESCRIPTION

In the following, embodiments of the description are described. It is important to note that all described embodiments in the following and their properties and technical features may be combined in any way, i.e. there is no limitation that certain described embodiments, properties and technical features may not be combined with others.

Figure 1:
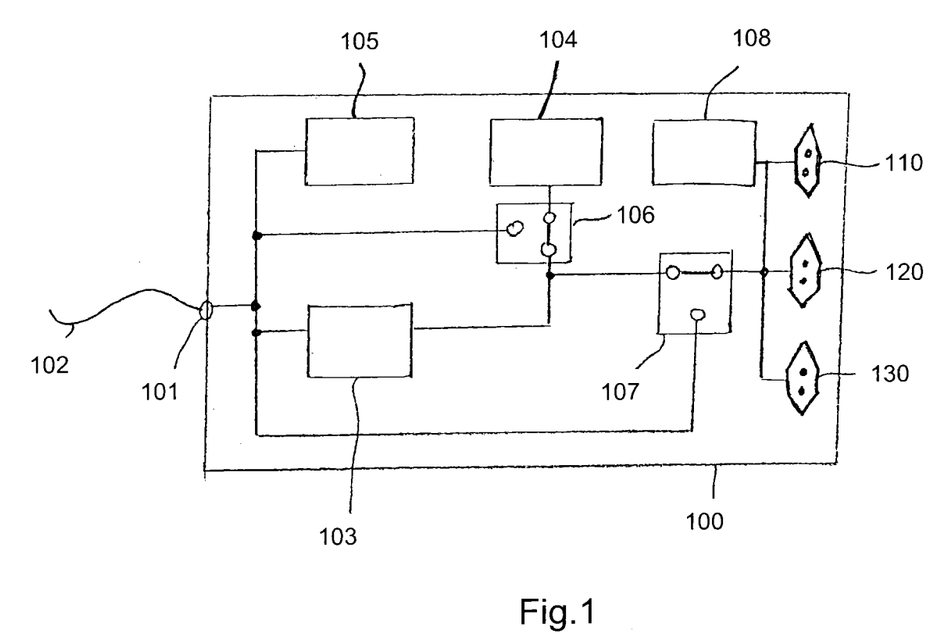
FIG. 1 shows a schematic block diagram of a device according to an embodiment of the invention.

In FIG. 1, a schematic block diagram of a device 100 is depicted, which may be used in a power line communication system. The device 100 comprises a power input 101 for supplying an external AC power to the device 100 via a power cord 102, which is connected to a power outlet (not shown) connected to a mains power network or a domestic power network (household electrical power wiring), for instance a wall outlet within a flat or a single-family house. It shall be noted that by the term "power input", any input for supplying an external AC power may be understood, for instance an input terminal arranged at an outside of a device and configured to be connected to a plug of a power cord or an internal connection of a power cord to internal components of a device. Further, by the term "power cord", a power cord having any length or even only a plug connected to a power input may be understood. The device 100 further comprises a filter 103, the input of which is connected to the power input 101 and which is configured to filter noise from outside the device 100 out of the supplied external AC power. Thereby the filter 103 generates a filtered AC power, which is supplied at the output of the filter 103. The output of the filter 103 is connected with at least one embedded power socket for supplying the filtered AC power to at least one other device. The at least one power socket may be placed, for example, at a rear side of the device 100.

In FIG. 1, three power sockets 110, 120, 130 are depicted for connecting up to three other devices to the device 100 and for supplying these other devices with the filtered AC power. However, the device 100 may comprise any number of power sockets as far as requirements of power consumption and safety are met. Furthermore, the power sockets 110, 120, 130 may be of any type, for instance Type A, B, C, D, E, F, G, I, K, L or M, and individual power sockets may be of different types.

The filter 103 may be any kind of electronic filter, which is suited to filter noise out of the external AC power supplied at the power input 101. That is, the filter 103 may be a passive or an active filter, an analogue or a digital filter, a high-pass, a low-pass or a band-pass filter or a combination of different filters. The filter 103 removes unwanted frequency components from the external AC power, which could interfere with a power line communication. The filter 103 generates a filtered AC power comprising no interfering frequency components or at least less interfering frequency components compared to the external AC power. A power line communication using the filtered AC power is characterized by an increased communication quality and communication reliability as well as a higher data throughput compared to a power line communication using the external AC power.

Furthermore, the filter 103 removes frequency components of a power line communication system using the filtered AC power such that they do not interfere on any devices connected to the external AC power.

The filter 103 isolates a power line communication network using the filtered AC power from a mains grid, for instance of a building, in both directions such that the power line communication network is not interfered by other devices or power line communication networks using the external AC power and does not interfere other devices or power line communication networks using the external AC power.

The device 100 is configured to supply at least one other device with a filtered AC power via a power cord connected with the at least one embedded power socket. Thus, the at least one other device may not be connected to the mains power network or the domestic power network at any other outlet.

The device 100 comprises a PLC modem 104, which is configured to be connected to at least one of the power sockets 110, 120, 130 and to transmit data to or receive data from another device (not shown in FIG. 2) connected to the one of the power sockets 110, 120, 130 connected with the PLC modem 104. For power line communication between the PLC modem 104 and the other device connected to the one of the power sockets 110, 120, 130, the filtered AC power provided by the filter 103 is used. That is, data are modulated on the filtered AC power, when the PLC modem 104 and the one of the power sockets 110, 120, 130 are connected to the output of the filter 103.

Optionally, the device 100 may comprise at least one further component 105, for instance a microcomputer, a display, a radio apparatus or any other component, wherein the at least one further component 105 is configured to be connected with the power input 101 and to be supplied with the external AC power. Thus, the at least one further component 105 does not interfere power line communication using the filtered AC power by creating noise.

The device 100 may further comprise a first switch 106. The first switch 106 is configured to connect the PLC modem 104 to the output of the filter 103 and to at least one of the power sockets 110, 120, 130 in a first switching state, as shown in FIG. 1. This allows the PLC modem 104 to communicate with at least one other device connected to the at least one of the power sockets 110, 120, 130 using the filtered AC power. In a second switching state, the first switch 106 is configured to connect the PLC modem 104 to the power input 101, directly. Thus, the PLC modem 104 can communicate with other devices connected to the mains power network or the domestic power network using the external AC power.

The device 100 may further comprise a second switch 107. The second switch 107 is configured to connect the at least one power socket 110, 120, 130 to the PLC modem 104 and to the output of the filter 103 in a first switching state, as shown in FIG. 1. This allows a device connected to the at least one of the power sockets 110, 120, 130 to communicate with the PLC modem 104 using the filtered AC power. In a second switching state, the second switch 106 is configured to connect the at least one power socket 110, 120, 130 to the power input 101. Thus, the filter 103 is bypassed or shortcut, and a device connected to the at least one of the power sockets 110, 120, 130 can communicate directly with other devices connected to the mains power network or the domestic power network using the external AC power.

Alternatively, it is also possible to provide a plurality of second switches 107, one for each power socket 110, 120, 130 of the device 100, so that it may be arbitrarily selected to bypass the filter 103 for particular power sockets 110, 120, 130 or not to bypass the filter 103.

Also alternatively, the PLC modem 104 may operate as a gateway between a device connected to the at least one of the power sockets 110, 120, 130 and the mains power network or the domestic power network. That is, the PLC modem 104 may bridge the PLC data from an internal network, which is used for communication between the PLC modem 104 and the at least one device connected to the at least one of the power sockets 110, 120, 130, to the outside.

The device 100 may comprise the first switch 106 or the second switch 107 or the first and the second switch 106, 107. If the device 100 comprises the first and the second switch 106, 107, there are different combinations of switching states possible. Furthermore, the first and the second switch 106, 107 may be integrated in one switching means.

The device 100 further comprises a managing means 108. The managing means 108 is configured to establish a data connection with any device plugged into any of the power sockets 110, 120, 130. Therefore, the managing means 108 may be able to control the first switch 106 and/or the second switch 107 as well as any further switches, such that a data connection is possible to be established between the managing means 108 and any of the power sockets 110, 120, 130. The managing means 108 is configured to detect whether a device plugged in, i.e. connected to any of the power sockets 110, 120, 130 is capable of a PLC functionality and is hence a PLC enabled device, or not. Hence, the managing means 108 is configured to detect whether any of the at least one other device is capable of PLC functionality, or is not capable of PLC functionality. In order to detect whether a certain other device connected to the device 100 is a PLC enabled device, the managing means 108 seeks to establish a data connection and in particular a data communication with the connected device using a low transmission signal power, low bandwidth and/or low center frequency, lower than that used during a power line communication.

In case the device connected to any of the power sockets 110, 120, 130 of the device 100 does not support PLC and is not a PLC enabled device, it will either not start to communicate with the managing means 108 or it will not be able to inform the managing means 108 that it supports PLC, so that it will be identified by the managing means 108 as to not be a PLC enabled device. In this case, the managing device 108 prevents any PLC functionality or signal from being provided to the respective one of the power sockets 110, 120, 130 to which the non PLC device is connected. In other words, the device 100 is insofar intelligent as it does not imply that any device connected to any one of its power sockets 110, 120, 130 will be a PLC enabled device and will not attempt to start any power line communication once a device is connected to the device 100.

The operation of the managing means 108 with a low transmission power, low bandwidth and/or low center frequency when detecting whether at least one other device is connected to the device 100 on the one hand, and the actual PLC operation may be understood so as to represent two different modes of operation. The managing means 108 is therefore configured to operate in a setup mode and/or in a PLC mode, and therefore the entire device 100 is also set to operate in a setup mode and/or a PLC mode. In the setup mode, the managing means 108 establishes a data connection with the at least one other device, using low transmission power, low bandwidth and/or low center frequency, compared to an actual power line communication, i.e. compared to the PLC mode. In case the managing means 108 determines that the at least one other device connected to the device 100 is capable of PLC functionality, the managing means 108 switches from the setup mode to the PLC mode, at least with respect to a connection with said at least one other device. That means, that the managing means 108 may operate in the PLC mode with respect to an exemplary first other device which was already determined to provide PLC functionality, while the managing means 108 operates in the setup mode with respect to an exemplary second other device, which could not yet be determined to provide PLC functionality or which has lost previous PLC functionality.

In case the at least one other device, or the exemplary second other device of the scenario described above, is recognized by the managing means 108 so as to not be capable of PLC functionality, the managing means 108 will not enter the PLC mode with respect to this at least one other device or the exemplary second other device. In the setup mode, PLC functionality is not provided by the managing means 108, i.e. by the device 100, at least for the respective other device. This means that the other device is restricted from PLC, which may be realized by actually cutting off the other device from a PLC source or PLC modem, or by simply not activating the respective PLC functionality for the other device via the respective adapters and/or cable connections. Thus it will be avoided that power line communication with a device which does not support PLC is established, i.e. attempted to be established using relatively high transmission signal power, high bandwidth and/or high center frequency, and hence parasite fields and other negative side effects of the PLC cluster are avoided. Moreover, since the detection of whether a connected device is PLC enabled or not is carried out only with low transmission signal power, low bandwidth and/or low center frequency, side effects from this detection routine are minimized.

The managing means 108 may additionally or alternatively be configured so as to inhibit any form of connection of the device 100 with a non PLC device, so that not only PLC functionality is restricted from being provided thereto, but also simple power supply to the device is restricted, for example by utilizing any of the switches 106, 107 of the device 100 in order to completely disconnect the non PLC device from the device 100. Also, after the managing means 108 has determined that an exemplary other device without PLC capability is connected to the device 100, not only the PLC mode will not be switched to, but also the setup mode may be terminated and any connection of the exemplary other device is cut off. Then, the exemplary other device is inhibited from causing parasitic effects on the device 100, which would occur in case a connection would be maintained.

In another case where an unknown device as one said other device is connected to any of the power switches 110, 120, 130 is a PLC enabled device, i.e. a device capable of PLC functionality, the detection of a device type connected is similar to the above. The managing means 108, again, seeks to establish a data connection and in particular a data communication with the connected device using a low transmission signal power, low bandwidth and/or low center frequency. That means, the setup mode is employed with respect to the unknown device. The low transmission signal power, low bandwidth and/or low center frequency, respectively, are lower than transmission signal power, bandwidth and center frequency which are used in or for a power line communication, i.e. in the PLC mode. Since the now connected other device is capable of PLC functionality in this present example, it is able to interpret the communication establishment and to output a respective feedback to the managing means 108 in order to establish the connection. Hence, the managing means 108 recognizes the now connected device as to be capable of PLC functionality and to thus be a PLC enabled device. Consequently, the managing means 108 switches to the PLC mode with respect to the previously unknown device and thus allows full PLC functionality to be provided to the now connected device, i.e. to the respective one of the power sockets 110, 120, 130 the PLC enabled device is connected to. The PLC functionality may be carried out employing higher transmission signals, higher bandwidth and/or higher center frequency than employed by the managing means 108 in the setup mode, because other than a non PLC device, the present PLC enabled device will be configured to minimize parasite impact on the PLC cluster even though PLC functionality is provided.

It is also possible that the managing means 108 is provided with a timing functionality so that it may operate in the setup mode and wait for a response from a connected device for a predefined period of time. Insofar, the setup mode may represent a mode of operation of the managing means 108 where no transmission signal power, no bandwidth and/or no center frequency is used, as the managing means is completely passive with respect to a data communication with the connected device. In case a response is not provided during the period, the managing means 108 may assume that no PLC enabled device is connected to the device 100 and remains in the setup mode, prevents PLC with the connected device, or even completely cuts off the connected device. It is also possible that the managing means 108 is provided with a functionality of noticing if any device is plugged in any of the power sockets 110, 120, 130. This may for example be achieved using resistance surveillance in the device 100. Each time such a connection is noticed by the managing means 108, the above described function of detection whether the connected device supports PLC functionality or not is carried out. That means that the managing means 108 always operates in the setup mode with respect to at least one other device when the at least one other device is connected to the device 100. Alternatively, the managing means 108 may carry out the described detection repeatedly with predefined or predetermined repetition cycles, without the need of noticing whether an other device is connected to the device 100 or not.

The above described feature of the managing means 108 being capable of establishing a communication with an external device connected to the device 100 can also be used for detecting whether a connected PLC enabled device is properly setup and works properly. As the managing means 108 attempts to establish a communication with a device connected to one of the power sockets 110, 120, 130, a low transmission signal power, low bandwidth and/or low center frequency challenge signal may be provided to the device in the setup mode. As explained beforehand, in case the device does not provide PLC functionality, no response as to the challenge signal issued from the managing means 108 will be sent or a response indicating that PLC is not supported, and the managing means 108 hence identifies the device as to be no PLC device.

However, in case the connected device is PLC enabled but is not properly configured, e.g. its settings or operation mode are not properly working, the PLC device may respond to the challenge signal of the managing means 108 in a way which allows the managing means 108 to detect that a PLC enabled device is indeed connected, but that is not properly set up or configured. For example, the response of the connected device may comprise signal power, bandwidth and/or center frequency which are different from those of a properly set PLC device. Hence, the managing means 108 may even recognize that a connected device, although being a PLC enabled device, is not properly set up. In this case, the managing means 108 may either completely disconnect the improperly set up device from the device 100, i.e. both from the PLC functionality and from the mere power supply. That means that the PLC mode is not entered with respect to this connected device. Alternatively, the improperly set up PLC device may be supplied only with simple electric power, but not with any PLC functionality. Accordingly, the setup mode of the managing means 108 may include providing an external device connected to the device 100 with electrical energy, but without additional power line communication functionality. Moreover, it is possible that the managing means 108 is configured to properly set up the connected PLC device, for example by causing it to reboot or by changing communication handling or specific PLC protocols so that the connected PLC device is properly set up.

By these functionalities, even PLC devices which are not properly configured or which may have lost a proper configuration given beforehand, and may therefore not be working properly, are prevented from improperly working or from working at all within the network. Since an improperly set up PLC device may severely interfere with other PLC devices in the PLC cluster, the managing means 108 and the device 100 provide a functionality to minimize such interference because improperly set up PLC devices are either not served or set up properly.

The device 100 may be provided with a first electromagnetic radiation shield, wherein the at least one other device is connected to the at least one power socket 110, 120, 130 via a powerline cable with twisted cords and/or with a second electromagnetic radiation shield. Additionally or alternatively, the at least one power socket is provided with a third electromagnetic radiation shield, having a characteristic wave impedance which is matched with a characteristic wave impedance of the powerline cable or another cable connected to the at least one power socket 110, 120, 130.

The device 100 may be, for example, a set-top box, a PLAYSTATION®, a HDD recorder, a radio receiver, a satellite receiver a computer, a HiFi amplifier, any system component of a HiFi rack, a timer unit, or an external power supply for several units.

The device 100 is however not limited to provide the above power line communication functionality, i.e. the gateway functionality for PLC that connects the outside PLC domain with a local PLC cluster exclusively, but may furthermore be adapted to serve also as a network hub, a network switch and/or a network router between all PLC enabled devices inside and/or outside the local PLC cluster. Hence, the device 100 provides functionality that is similar or even identical to that of intelligent network nodes of LAN or WLAN networks, respectively. The device 100 is also not limited to power line communication functionality but may include interfaces and full routing support with other communication technologies such as LAN, WLAN, USB, FireWire, MoCA, for example, and many other technologies.

Moreover, the device 100 can also be adapted to manage the above described power line communication functionality and setting up of the participating devices in a local cluster, without necessarily providing a functionality for interconnecting the local cluster with a further cluster or an external network. In this case, all gateway functionality as described above refers only to the participating devices in the local cluster and not to a gateway functionality for handling external requests or providing outgoing data to the external of the local cluster.

The term "cluster" refers to a plurality of PLC enabled devices which are connected after the power input 101, i.e. the device 100 and any PLC device connected to any of the power sockets 110, 120, 130. This PLC cluster may be regarded as a PLC network which may be connected to the overall PLC system providing the PLC functionality to the device 100, but which may constitute a macroscopic network such as an intra-network comprising the device 100 and the PLC devices connected thereto. Thus, the device 100 provides the functionality of an interface to data exchange technologies and media, other than only PLC device functionality.

Examples for other devices connected to the at least one power socket 110, 120, 130 of the device 100 may be a TV, a CD player, a HiFi amplifier, any system component of a HiFi rack, a timer unit, or an external power supply for several units.

In the device 100 electrical radiation in the local PLC cluster is minimized by one or more of the following measures further than the filtering described above. Any power line cables or cords may be twisted, so that the electromagnetic radiation thereof is minimized. It is also possible to shield power line cables or cords with a respective shielding, for example by means of an isolated metal mesh wrapped around the cable or cord. Alternatively or additionally, any connectors, sockets, adapters, and switches may be electromagnetically shielded in order to minimize electromagnetic radiation thereof. Furthermore, the device 100 itself may be provided with an electromagnetic shielding in order to minimize electromagnetic radiations.

Figure 2:
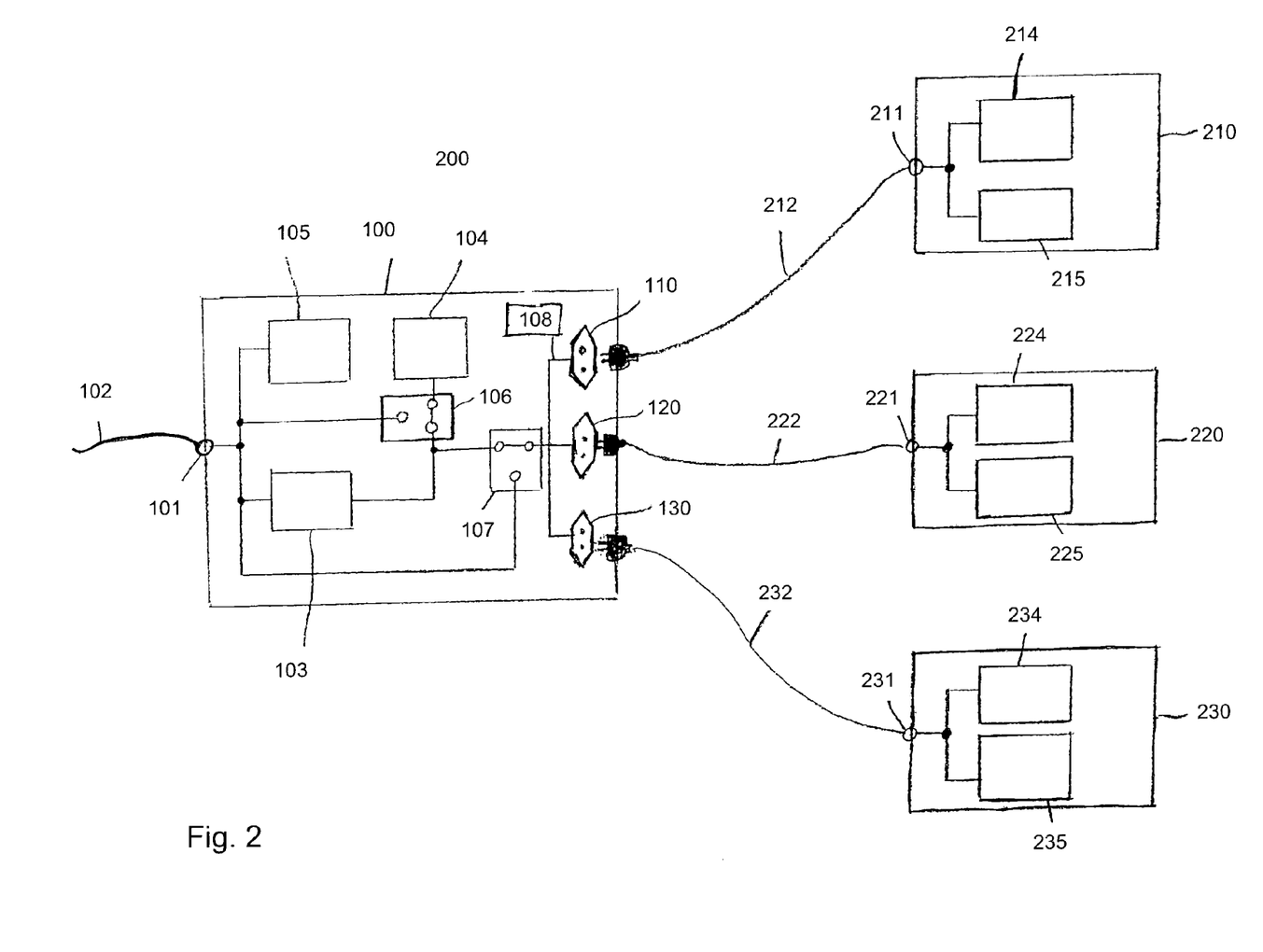
FIG. 2 shows a schematic block diagram of a power line communication system according to an embodiment of the invention, wherein all devices comprise a PLC modem.

FIG. 2 depicts a schematic block diagram of a power line communication system 200 according to an embodiment of the invention. The PLC system 200 comprises a first device 100 and at least one second device. In FIG. 2, three second devices 210, 220, 230 are depicted by way of example. However, the system 200 may comprise any number of second devices, for instance only one or more than three.

The first device 100 complies with the device 100 described with respect to FIG. 1. The first device 100 comprises a first power input 101 for supplying an external AC power to the first device 100 via a first power cord 102, which is connected to a power outlet (not shown) connected to a mains power network or a domestic power network. The first device 100 further comprises a filter 103, the input of which is connected to the first power input 101 and which is configured to filter noise from outside the first device 100 out of the supplied external AC power. Thereby the filter 103 generates a filtered AC power, which is supplied at the output of the filter 103. The output of the filter 103 is connected with at least one embedded power socket for supplying the filtered AC power to the at least one second device. In FIG. 2, three power sockets 110, 120, 130 are depicted by way of example. However, the first device 100 may comprise any number of power sockets, wherein the number of power sockets at least equals the number of second devices of the system 200. That is, for example, if the number of second devices is 2, the number of power sockets is 2 or more than 2.

The device 100 further comprises a PLC modem 104. The PLC modem 104 is configured to be connected to the at least one power socket 110, 120, 130 and to transmit data to or receive data from the at least one other or second device 210, 220, 230.

Each of the second devices 210, 220, 230 comprises a second power input 211, 221, 231, respectively, for supplying an AC power to the second device 210, 220, 230 via a respective second power cord 212, 222, 232, which is configured to be connected to one of the power sockets 110, 120, 130. The plug of the second power cord 212, 222, 232 should be adapted to the type of the power socket 110, 120, 130, to which it is connected. The AC power supplied to the second device 210, 220, 230 may be the filtered AC power generated by the filter 103 or may be the external AC power, if the first device 100 comprises a second switch 107 as described above.

Each of the second devices further comprises a respective second PLC modem 214, 224, 234 which is configured to be connected to the respective second power input 211, 221, 231 and to transmit data to or receive data from the first PLC modem 104 or from another device via power line communication.

That is, the first device 100 may communicate with at least one of the second devices 210, 220, 230 via power line communication using the filtered AC power. Furthermore, at least one second device 210, 220, 230 can communicate directly with another second device 210, 220, 230 via power line communication using the filtered AC power. If the first device 100 comprises a first switch 106 as described above, the first device 100 may communicate with other devices connected to the mains power network or the domestic power network using the external AC power in a second switching state of the first switch 106. Furthermore, the first PLC modem 104 may bridge data from at least one of the second devices 210, 220, 230 to other devices connected to the mains power network or the domestic power network using the external AC power. If the first device 100 comprises a second switch 107 as described above, the second devices 210, 220, 230 may communicate directly with other devices connected to the mains power network or the domestic power network in a second switching state of the second switch 107, wherein the external AC power is used for power line communication.

Optionally, each or some of the second devices 210, 220, 230 may comprise at least one further component 215, 225, 235, respectively, wherein the further components use the AC power supplied by the respective second power inputs 211, 221, 231. Examples of further components 215, 225, 235 are a display, a microcontroller, a loud speaker or others.

The first device, i.e. the device 100 of the PLC system 200 may be, for example, a set-top box, a TV, a playstation, a HDD recorder, a radio receiver, a DVD player, a computer, a HiFi amplifier, any system component of a HiFi rack, a timer unit, a power junction box, or an external power supply for several units.

Examples for second devices, i.e. any of the at least one other device of the PLC system 200 may be a set-top box, a TV, a playstation, a HDD recorder, a radio receiver, a DVD player, a computer, a HiFi amplifier, any system component of a HiFi rack, a timer unit, a power junction box, or an external power supply for several units.

The system 200 may, for instance, be a HiFi application system or any other system using one external power supply for several units.

Figure 3:
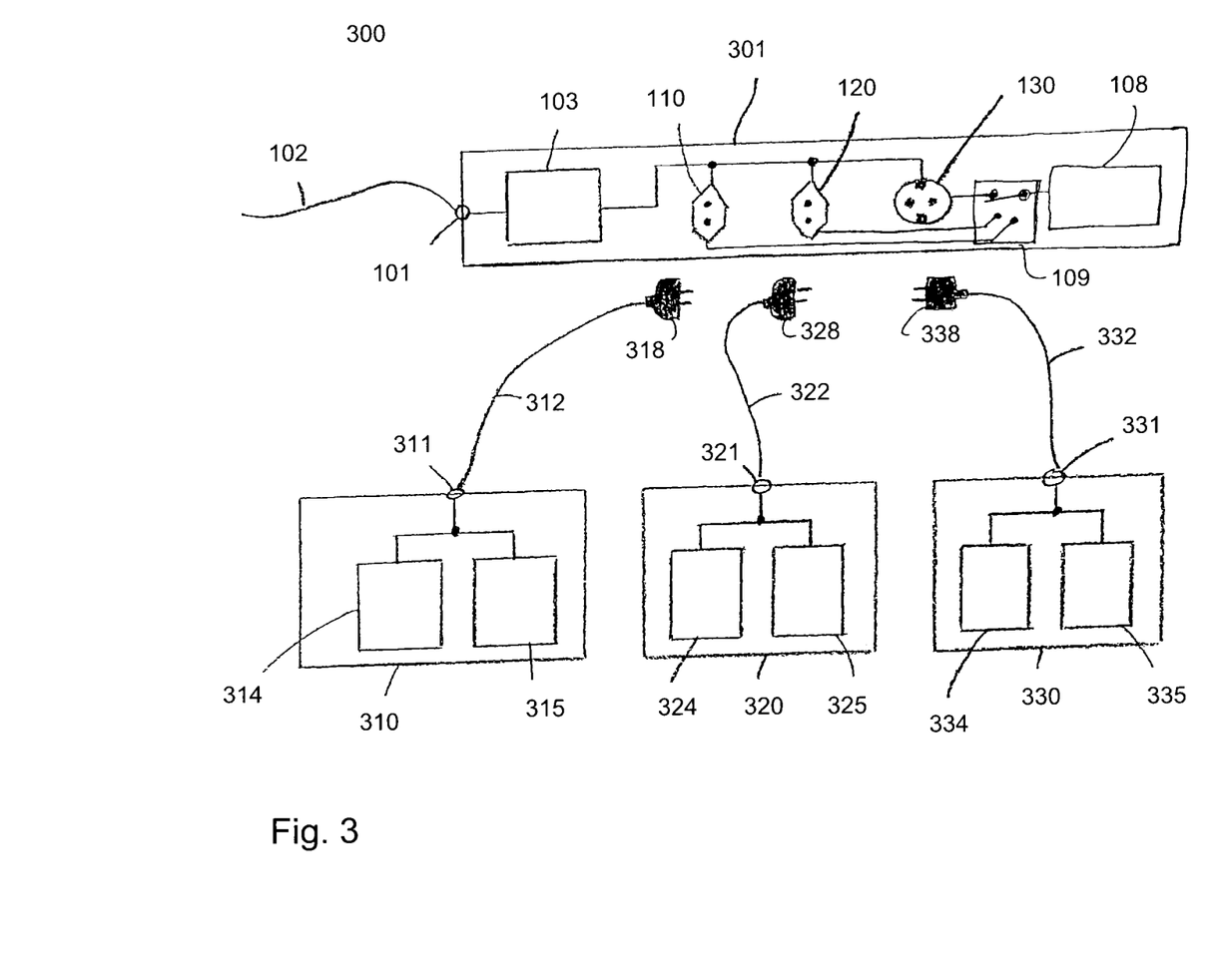
FIG. 3 shows a schematic block diagram of a power line communication system according to a further embodiment of the invention, wherein the PLC system is isolated from a mains power network by a first device not comprising a PLC modem.

In FIG. 3, a schematic block diagram of a power line communication system 300 according to another embodiment of the invention is depicted. The PLC system 300 comprises a first device 301 and a plurality of second devices. In FIG. 3, three second devices 310, 320, 330 are depicted by way of example. However, the system 300 may comprise any number of second devices larger than 1, for instance two or more than three.

The first device 301 comprises a first power input 101 for supplying an external AC power to the first device 301 via a first power cord 102, which is connected to a power outlet (not shown) connected to a mains power network or a domestic power network. The first device 301 further comprises a filter 103, the input of which is connected to the first power input 101 and which is configured to filter noise from outside the first device 301 out of the supplied external AC power. Thereby the filter 103 generates a filtered AC power, which is supplied at the output of the filter 103. The output of the filter 103 is connected with a plurality of embedded power sockets for supplying the filtered AC power to the plurality of second devices. In FIG. 3, three power sockets 110, 120, 130 are depicted by way of example. However, the first device 301 may comprise any number of power sockets, wherein the number of power sockets at least equals the number of second devices of the system 300. That is, for example, if the number of second devices is 2, the number of power sockets is 2 or more than 2. In contrast to the device 100 described with respect to FIG. 1, the first device 301 does not comprise a PLC modem. Optionally, the first device 301 may comprise a switch similar to the second switch 107 described with respect to FIG. 1.

Each of the second devices 310, 320, 330 comprises a second power input 311, 321, 331, respectively, for supplying the filtered AC power to the second device 310, 320, 330 via a respective second power cord 312, 322, 332, which is configured to be connected to one of the power sockets 110, 120, 130. A plug 318, 328, 338 of the second power cord 312, 322, 332 should be adapted to the type of the power socket 110, 120, 130, to which it is connected.

Each of the second devices further comprises a respective PLC modem 314, 324, 334, which is configured to be connected to the respective second power input 311, 321, 331 and to transmit data to or receive data from at least one other PLC modem 314, 324, 334. Since filtered AC power is used for power line communication, the PLC system 300 communicates isolated from the mains power network or the domestic power network using the external AC power.

The first device 301 of the PLC system 300 supplies the filtered AC power to the second devices 310, 320, 330 and thus provides an AC power without interferences from outside for power line communication between the second devices 310, 320, 330. The first device 301 itself does not communicate with other devices within the PLC system 300.

Optionally, each or some of the second devices 310, 320, 330 may comprise at least one further component 315, 325, 335, respectively, wherein the further components are supplied with the filtered AC power.

The first device 301 of the PLC system 300 may, for example, be a multiple extension power strip or a multi-outlet power strip including a plurality of power sockets, and the second devices of the system 300 may be, for instance, selected from the group comprising a set-top box, a PLAYSTATION®, a HDD recorder, a radio receiver, a computer, a TV, a CD player, a HiFi amplifier, any system component of a HiFi rack, a timer unit, or an external power supply for several units.

Often, different devices being able to communicate with each other are placed, for instance, in one room and are separated from each other only by a short distance. If these devices want to communicate with each other, data might be distributed by HDMI cable connected to at least two of the devices or by a wireless link, for example. Distributing data between a first device and one or more second devices as described with respect to the PLC system 200 or between one or more of the second devices as described with respect to the PLC system 300 via power line communication using a filtered AC power according to the invention may replace HDMI cables, IEEE 1394, VGA, DVI, USB, eSATA, ETH or others. As well, the invention may replace wireless links like IEEE 802.11, WiFi, WHDI, UWB, Wireless HDMI, Wireless HD, Wireless USB, ZigBee, Bluetooth or others. This renders the assembly and the architecture of the system comprising the devices communicating with each other to be more simple as compared to a HDMI cable based system, since no cable other than the power cord is required for each device. Furthermore, each device can communicate with each other device without the necessity of a bridging component transferring data received by a first HDMI cable to a second HDMI cable. Compared to a system based on wireless links between the devices communicating with each other, the PLC systems according to the invention are cheaper and more reliable.

Furthermore, the devices of the PLC systems according to the invention may reduce their feeding signal level to a minimum using adaptive power management. This relaxes requirements to the filter 103 and reduces interferences of other devices and systems caused by the devices of the PLC system.

On the other hand, the power line network of the PLC systems according to the invention may use higher power levels, since the power line network is isolated from the mains power network or from the domestic power network by the filter 103.

Moreover, the power line communication system 300 shown in FIG. 3 forms a PLC cluster, i.e. a PLC network comprising the device 301 and the second devices 310, 320, 330 which are connected to an overall PLC network. PLC communication within the PLC cluster as well as PLC communication with the overall PLC network are possible. Interferences which may impact on the PLC cluster and/or the overall PLC network are effectively minimized or even completely overcome and, consequently, also data throughput rates and usage flexibility are maximized. This is achieved by the above described functionalities, in particular provided by the filter 103, and also by the functionality provided by managing means 108 of the device 301.

The managing means 108, in this embodiment, can be connected to each of the power sockets 110, 120, 130 at one time via switch 109. The managing means 108 is capable of identifying whether one of the second devices 310, 320, 330 or any further device plugged into any of the power sockets 110, 120, 130 is a correctly set up PLC enabled device, a PLC device which is not correctly set up or working or a device which does not support PLC functionality. The managing means 108 may connect to the respective second or further device connected to one of the power sockets 110, 120, 130 via the switch 109 which establishes a respective electric connection. The managing means 108 then sends a PLC signal to the respective connected device via the switch 109 and the respective power socket the device is connected to. The PLC signal has low transmission power, low bandwidth and/or low center frequency because in case the connected device is malfunctioning or is no PLC enabled device, the PLC signal would risk to be emitted within the PLC cluster via the employed wiring or even via air in the form of an electromagnetic field. As long as the connected device is not identified or detected by the managing means 108 as to be a correctly set up PLC enabled device, a PLC communication with the connected device is not established using higher transmission power as in a regular power line communication operation.

In brief, the managing means 108 sends a PLC challenge signal to the connected device and will allow a regular PLC communication with it only in case the connected device responds to the challenge signal with a PLC response signal with a predefined transmission power, bandwidth and/or center frequency or with a predefined data content.

It is to be noted that the described functionality of the managing means 108 and also of the switch 109 may be provided independently of the filter 103 and vice versa. That is, the device 100 of FIG. 1 as well as the device 301 of FIG. 3 may comprise the filter 103 and the managing means 108 or only the filter 103 without the managing means 108 or only the managing means 108 without the filter 103.

Moreover, each of the second power cords 312, 322, 332, comprises a respective one of plugs 318, 328, 338, wherein the plugs 318, 328, 338 are, as already described above, adapted to the type of the power socket 110, 120, 130, to which it is connected. Additionally, each of the plugs 318, 328, 338 may be configured to detect whether it is connected, i.e. plugged into any of the power sockets 110, 120, 130 directly, or via any additional adapter, adapter cable or other device, for example. This may be realized using a mechanic coupling between one of the power sockets 110, 120, 130 and one of the plugs 318, 328, 338 which may indicate the interconnection of another item or which will even inhibit a connection via another item. Alternatively, the plugs 318, 328, 338 may comprise an electromagnetic field sensor capable of sensing an electromagnetic field in particular in the proximity of the respective one of the plugs 318, 328, 338.

In case for example an additional adapter is interconnected between the plug 318 and the power socket 110, which adapter is not dedicated for PLC communication or for being employed in a PLC cluster or network, an electromagnetic field radiation will result from the adapter in case of a power line communication. The plug 318 will in this case sense the electromagnetic field emitted from the adapter and conclude that a non PLC ready item is present in the PLC cluster or PLC network. Consequently, the plug 318 may for example send a respective warning signal to the managing means 108 in order to cause the latter to terminate any PLC with the second device 310 the plug 318 is associated with. As another example, it is also possible that the plug 318 itself terminates any electric connection inhibits any data exchange with the device 301. Thus, the non PLC ready adapter is prevented from passing PLC signals and to thus have a parasite signal impact on the PLC cluster.

Additionally or alternatively, the power sockets 110, 120, 130 of the device 301 may be capable of sensing whether a non PLC ready item is present in the PLC cluster, in the ways explained above for the plugs 318, 328, 338.

Moreover, the described detection functionality of the plugs 318, 328, 338 and/or of the power sockets 310, 320, 330 can even be extended by an active identification functionality. According to this functionality, each of the plugs 318, 328, 338 for example may store an identification (ID) data which may be provided to the device 301 once a respective electrical connection is established there-between. The ID data may not only identify the respective one of the second devices 310, 320, 330 as being a PLC enabled device, but may furthermore convey an information on what signal levels, bandwidth, center frequencies, electromagnetic shielding or radiation levels are supported by the respective second device. This information is to be provided to the managing means 108 and serves for identifying which signal levels, bandwidth, center frequencies and/or electromagnetic shielding or radiation levels are supported or to be expected when a PLC connection is established with the respective second device or the latter is operated. For example, the ID data may comprise an information for the managing means 108 on which range of signal levels are to be expected to be provided from the respective second device.

For example, in case a signal is received at the managing means 108 from the respective second device, which exceeds the signal level range according to the ID data, the managing means 108 can exclude the second device from any further power line communication or even electric power supply. Thereby it will be assured that signal levels are kept within a predefined range and the PLC cluster is not disturbed due to exceeding signal levels. In another example, in case the managing means 108 receives a signal from said second device which has a signal level below the specified level according to the ID signal, it may also disconnect said second device from any further power line communication and even a power supply. Even though parasite electromagnetic fields will not occur due to the low signal level provided from the second device, it could be expected that any other malfunction of the second device is present which could eventually come along with an arbitrary form of PLC disturbance either directly via the utilized power line cables or via electromagnetic field emission in the air. Hence, any disturbance of PLC signal quality in the PLC cluster and the overall PLC network are further minimized.

Figure 4:
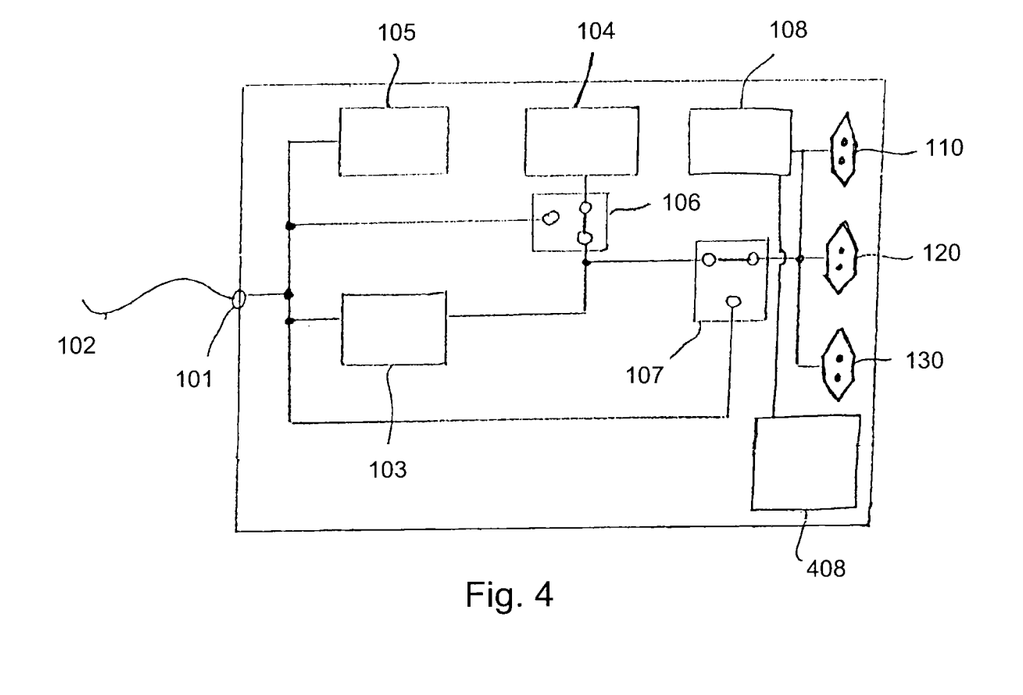
FIG. 4 shows a schematic block diagram of a device according to an embodiment of the invention according to a further embodiment of the invention.

FIG. 4 shows a schematic block diagram of a device 400 according to a further embodiment of the invention, which is based on the device 100 of FIG. 1 but comprises additional functionality. Hence, the device 400 comprises the items 101 to 108, 110, 120 and 130 as in FIG. 1. Moreover, the device 400 comprises a PLC compliance detecting means 408 capable of detecting damaged cables within the PLC cluster, any malfunction of the device 100 causing unwanted electromagnetic field emission or any further devices within the PLC cluster which are malfunctioning or which are even not PLC enabled and therefore emit unwanted electromagnetic fields. Therefore, the detecting means 408 may for example comprise an antenna element or any other element capable of detecting electromagnetic field, and is adapted to judge whether a received field is within an allowed range or not. In the latter case, the detecting means 408 may instruct the managing means 108 to disconnect certain second devices from the PLC cluster for example. The detecting means 408 may, however, also comprise an impedance detector which is adapted to detect whether an impedance of the utilized cables within the PLC cluster is outside an allowed range. The latter will for example be the case when a power cord for connecting an external device to the device 100 is damaged. Then, it can be expected that a power line communication via this cord will lead to parasite electromagnetic interference which may disturb the PLC cluster. Hence, the resulting electromagnetic interference itself can be detected by the detection means 408 and/or the damage of the respective cord due to an altered impedance relative to an allowed range of impedance can be detected.

It is important to be understood that the managing means 108 and the detecting means 408 are provided as separate items of the device 100, but the both may of course also be implemented as one single item covering the respective functionalities by its own.

Figure 5:
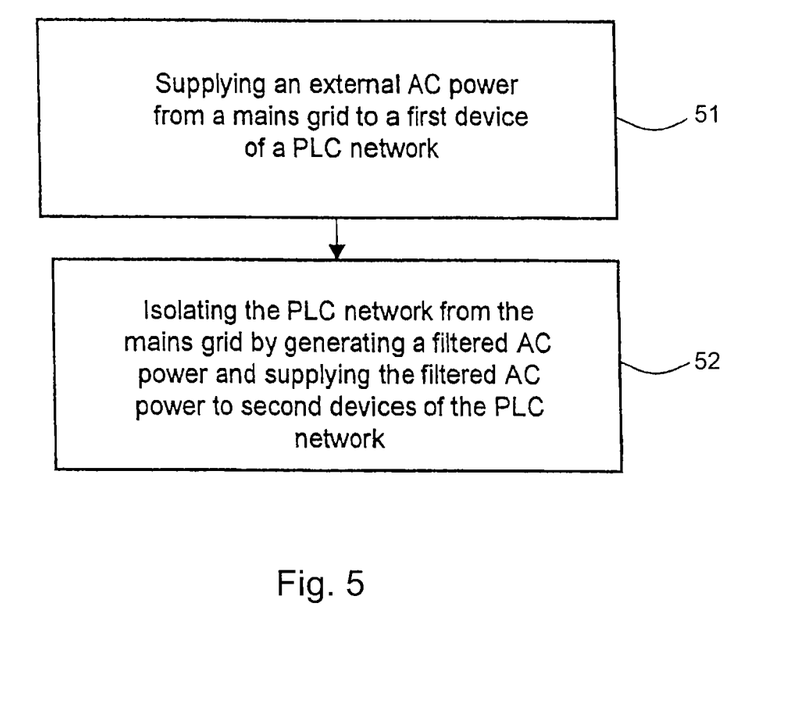
FIG. 5 shows a flow chart of a power line communication method according to an embodiment of the invention.

FIG. 5 illustrates a flow chart of a power line communication method. The method for power line communication within a power line communication network including a first device and at least one second device comprises supplying an external AC power from a mains grid to the first device (step 51) and isolating the power line communication network from the mains grid (step 52). The first device may participate in the power line communication within the PLC network or may only supply a filtered AC power used for power line communication between the second devices within the PLC network. The external AC power may be supplied to the first device, for example, by a power cord connected with a power input of the first device on the one hand and with a power outlet of the main grid, for instance a building or a mains power network, on the other hand.

The power line communication network is isolated from the mains grid by generating a filtered AC power within the first device by a filter filtering noise from the mains grid out of the external AC power, by supplying the filtered AC power to the at least one second device and by using the filtered AC power for power line communication within the PLC network. The noise, which should be filtered out from the external AC power, may be caused, for example, by interferences from other devices or other PLC networks connected to the external AC power. The filtered AC power may be supplied to the at least one second device, for instance, by a power cord connected with a power input of the second device on the one hand and with a power socket being part of the first device. The power socket of the first device is configured to be connected with the outlet of the filter.

Figure 6:
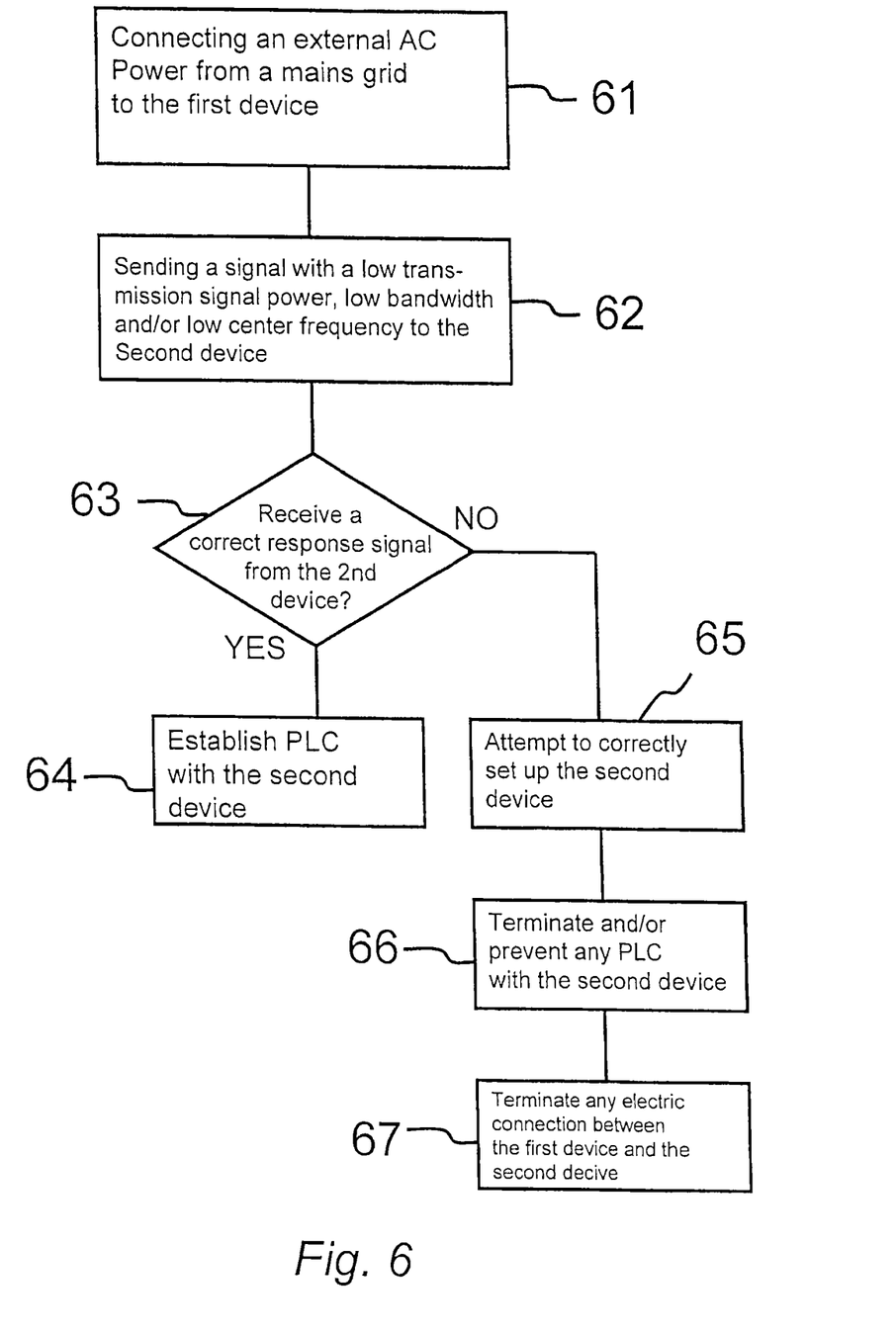
FIG. 6 shows a flow chart of a power line communication method according to a further embodiment of the invention.

FIG. 6 shows a flow chart of a power line communication method according to a further embodiment of the invention. The method for power line communication within a power line communication network including a first device and at least one second device comprises connecting or supplying an external AC power from a mains grid to the first device (step 61) and sending, by a managing means of the first device, a signal with a low transmission signal power, low bandwidth and/or low center frequency to the second device (step 62).

In the following step (step 63) the first device, in particular the managing means, awaits a response from the second device, i.e. the second device attempts to respond to the signal issued by the managing means by a response signal. The first device may either receive a correct response signal from the second device (YES) or do not receive a correct response signal (NO). It is equivalent to receiving no correct response signal if no response signal at all is received (NO). A correct response signal may for example correspond in its transmission signal power, bandwidth and/or center frequency to the signal issued by the managing means or meet with predefined signal parameters or data content stored beforehand as a reference in the first device. In this case, the managing means judges that the second device is a correctly set up PLC enabled device and establishes a power line communication with the second device (step 64). Thus, the second device makes part of a PLC cluster together with the first device and with possible further correctly set up PLC enabled devices of a respective PLC cluster.

In case no correct signal is received by the first device, the first device attempts to reconfigure or to correctly set up the second device (step 65), for instance by means of the managing means which can reboot the second device or reconfigure its settings. This is particularly advantageous in case the second device is a PLC enabled device which could work properly in the PLC cluster but is only malfunctioning because a wrong set up. Further, any power line communication with the second device can be terminated (step 66), which is particularly relevant in case a malfunctioning PLC enabled second device is not able to be correctly set up, or in case a non PLC enabled second device is present. Still further, even any electric power connection between the first and second device can be terminated (step 67). Hence, malfunctioning PLC enabled devices as well as devices which do not support PLC are removed or restricted from the PLC cluster, which minimizes any deterioration of the power line communication in the PLC cluster and the overall PLC network due to electromagnetic radiation propagated via cables or via air. Consequently, data transfer rates are maximized in the PLC cluster. Also, flexibility of the PLC cluster is maximized because the managing means of the first device manages the establishing of power line communication such that only properly set up PLC devices take place in the PLC cluster and the connection of malfunctioning or improperly shielded second PLC or non PLC devices do not deteriorate the communication in the PLC cluster.

Figure 7A:
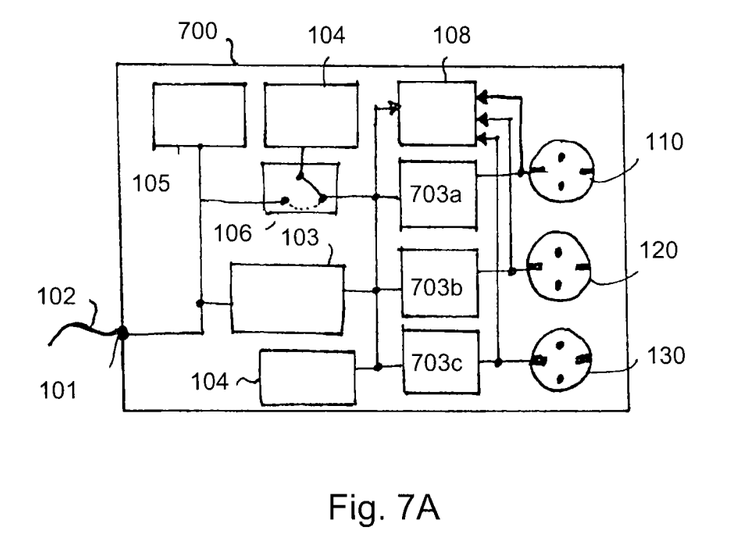
FIG. 7A shows a schematic block diagram of a power line communication system according to a further embodiment of the invention, wherein an additional filter is provided for each socket.

In FIG. 7A, device 700 is shown, which corresponds to the device 100 of FIG. 1 insofar as it comprises corresponding power input 101, power cord 102, filter 103, PLC modem 104, optional further component 105, first switch 106, managing means 108 and power sockets 110, 120, 130. Additionally to the filter 103, separate particular filters 703a, 703b, 703c are provided, wherein each of the particular filters 703a, 703b, 703c is provided for a particular one of the sockets 120, 120, 130. The control unit 108, further to being capable of controlling the filter 103, is also capable of controlling each of the particular filters 703a, 703b, 703c.

Different devices can be connected to the sockets 110, 120 130, in particular PLC enabled devices or non-PLC enabled devices. The shown arrangement according to FIG. 3 provides the effect that PLC signals coming from a connected PLC enabled device cannot propagate through a non-shielded powerline cable. This is particularly advantageous for powerful broadband signals coming from PLC enabled devices. Each of the particular filters 703a, 703b, 703c is provided for any connected further device connected to the sockets 110, 120, 130 and can therefore suppress incoming PLC signals which would otherwise propagate through a non-shielded powerline for example to a non-PLC enabled further device. Such a powerful broadband signal coming from a PLC enabled further device would represent a powerful disturbance signal for a non-PLC enabled device, which, as connected to a PLC network or PLC cluster, would again be able to introduce such disturbance signal into the network or cluster. However, as the particular filters 703a, 703b, 703c are arranged for each socket 110, 120, 130, possible disturbance signals are prevented from propagating through non-shielded power lines.

Figure 7B:
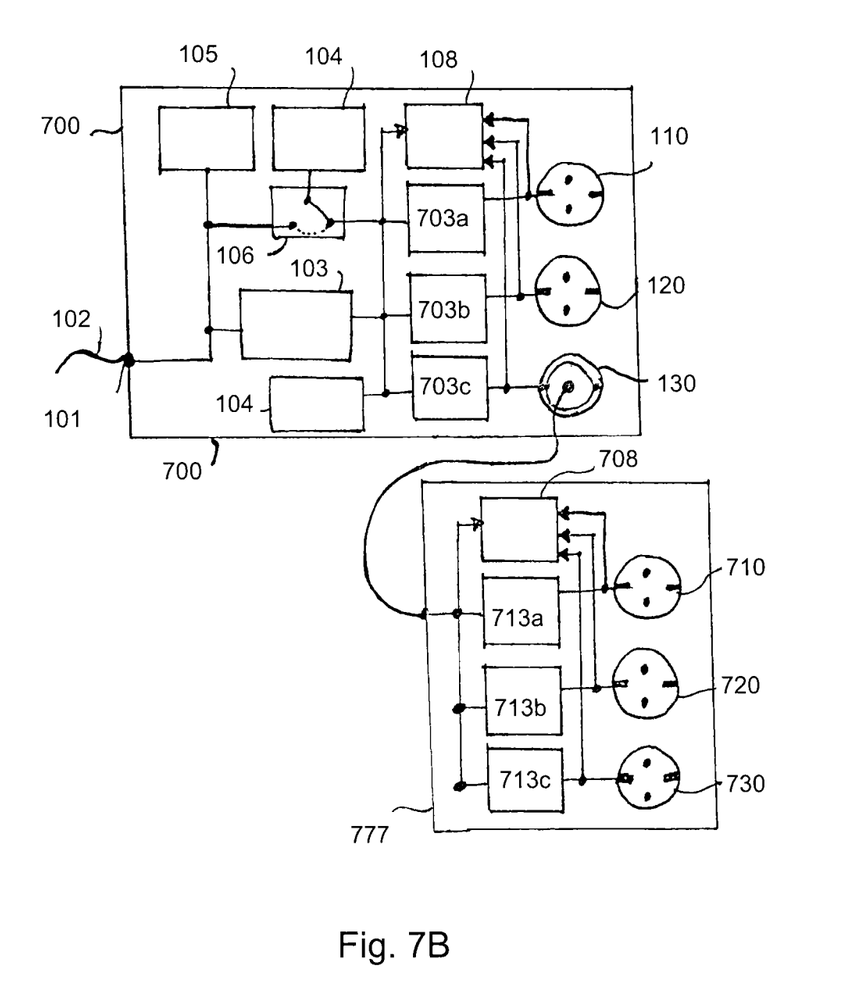
FIG. 7B shows a schematic block diagram of a power line communication according to a further embodiment of the invention, forming a PLC cluster.

The further benefits of such an arrangement are also explained with reference to FIG. 7B. A corresponding device 700 as in FIG. 7B is provided. Moreover, a similar device 777 as device 700 is connected to device 700 so as to form a PLC cluster system comprising the devices 700 and 777. In particular, device 777 comprises sockets 710, 720, 730 corresponding to sockets 110, 120, 130 of the device 700. Also, a managing means 708 is provided, which corresponds to the managing means 108 of device 700. In correspondence to the particular filters 703a, 703b, 703c of device 700, device 777 comprises particular filters 713a, 713b, 713c, which are also separately provided for each of the sockets 710, 720, 730, respectively.

Any device, i.e. a PLC enabled further device and a non-PLC enabled further device may be connected to the sockets 110, 120, 130, 710, 720, 730, while device 777 is actually a PLC enabled device. Hence, in case a PLC enabled further device is connected for example to socket 720 of device 777, and devices 777 and 700 are interconnected to form the PLC cluster, a broadband PLC propagating from the connected PLC enabled further device via device 777 to device 700, cannot propagate through a non-shielded powerline cable.

Managing units 108, 708 attempt to establish a PLC communication with connected further devices and may control each of the respective particular filters 703a, 703b, 703c or 713a, 713b, 713c, respectively. A power line communication can then be realized in case a PLC enabled further device is connected, in such way that the possible unwanted signal radiation is kept to a minimum, e.g. using low spectral power density.

Each of the filters 703a, 703b, 703c, 713a, 713b, 713c may be any kind of electronic filter, which is suited to filter noise out of the external AC power supplied at the power input 101 reaching the respective filters, as well as to filter noise out of any incoming signal and/or AC power incoming via the sockets 110, 120, 130, 710, 720, 730. That is, each of the filters 703a, 703b, 703c, 713a, 713b, 713c may be a passive or an active filter, an analogue or a digital filter, a high-pass, a low-pass or a bandpass filter or a combination of different filters, and can remove unwanted frequency components from a signal and or power, which could interfere a power line communication or even affect a non-PLC communication. The filters 703a, 703b, 703c, 713a, 713b, 713c can thus basically correspond to filter 103 of device 100 and 700, respectively.

In particular, each of the filters 703a, 703b, 703c, 713a, 713b, 713c may be controlled via the respective managing means 108 and 708, respectively, so as to realize specific filter characteristics. For example, in case a non-PLC enabled further device is connected to socket 120, managing means 108 may control corresponding filter 703b so as to work as a low-pass filter, allowing only 50 Hz or e.g. only 50-60 Hz signals to pass. In case a PLC enabled further device is connected, filter 703b is controlled by managing means 108 so as to have a filter characteristic corresponding to the particular PLC further device, e.g. to limit the bandwidth to 30 MHz for older PLC devices.

The multiple managing means of devices 700 and 777, i.e. managing means 108 and 708 may communicate with each other, preferably employing power line communication, in order to adapt the filter controls and the respective filter settings within the PLC cluster, so that the filtering is globally optimized within the cluster. If for example a particular one of filters 713a, 713b, 713c cannot completely suppress an identified unwanted signal component, filter 703c may be controlled in order to compensate also for this lack of suppression and to eventually suppress said unwanted signal component at least in device 700.

The invention claimed is:

1. A device comprising:
power input circuitry configured to supply an external AC power to the device via a power supply line;
filter circuitry configured to filter out noise from the supplied external AC power and to generate a filtered AC power;
at least one power socket configured to supply the filtered AC power to at least one other device, external to the device, connected to the at least one power socket;
a Power Line Communication (PLC) modem configured to be connected to the at least one power socket and to transmit data or receive data via the at least one power socket using power line communication and the filtered AC power; and
managing circuitry configured, in a setup mode, to establish a data connection with the at least one other device and to detect whether the at least one other device is capable of PLC functionality,
wherein the establishing the data connection with the at least one other device includes outputting a first signal to the at least one other device, the outputted first signal having one or more of a first transmission signal power, a first bandwidth and a first center frequency, each of which is respectively lower than a second transmission signal power, a second bandwidth, and a second center frequency of a second signal output by the managing circuitry in a PLC mode.

2. The device according to claim 1, wherein the managing circuitry is configured to selectively set the device to operate in one of the PLC mode and the setup mode.

3. The device according to claim 2, wherein the managing circuitry is configured to operate in the setup mode responsive to connection of the at least one other device to the at least one power socket, so as to establish the data communication with the at least one other device.

4. The device according to claim 2, wherein the managing circuitry is configured to operate in the PLC mode when the managing circuitry has detected that the at least one other device is capable of PLC functionality.

5. The device according to claim 2, wherein the managing circuitry is configured to continue operating in the setup mode when the managing circuitry has detected that the at least one other device is not capable of PLC functionality.

6. The device according to claim 1, wherein the managing circuitry is configured to operate in the setup mode with respect to a first one of the at least one other device and to operate in the PLC mode with a second one of the at least one other device, at the same time.

7. The device according to claim 1,
wherein the device is provided with a first electromagnetic radiation shield,
wherein the at least one other device is connected to the at least one power socket via a powerline cable with twisted cords and/or with a second electromagnetic radiation shield, and/or
wherein the at least one power socket is provided with a third electromagnetic radiation shield, having a characteristic wave impedance which is matched with a characteristic wave impedance of the powerline cable or another cable connected to the at least one power socket.

8. The device according to claim 1,
wherein the device is configured to provide functionality of a network hub, a network switch, a router, and/or an intelligent network node of a LAN or a WLAN, and
wherein the managing circuitry is configured to provide at least one other communication technology of the group of LAN, WLAN, USB, FireWire and MoCA.

9. The device according to claim 1, further comprising:
a first switch configured to connect an output of the PLC modem to the at least one power socket in a first switching state thereof and to connect the output of the PLC modem to the power input in a second switching state thereof,
wherein the PLC modem is not connected to the at least one power socket in the second switching state and is not connected to the power input in the first switching state.

10. A power line communication (PLC) system comprising:
a device; and
at least one further device external to the device,
wherein the device includes:
power input circuitry configured to supply an external AC power to the device via a power cord,
a filter configured to filter the supplied external AC power and to output a filtered AC power,
at least one power socket configured to supply the filtered AC power to the at least one further device,
a PLC modem configured to be connected to the at least one power socket and to transmit data or receive data via the at least one power socket using power line communication and the filtered AC power, and
managing circuitry configured, in a setup mode, to establish a data connection with the at least one further device and to detect whether the at least one further device is capable of PLC functionality,
wherein the establishing the data connection with the at least one further device includes outputting a first signal to the at least one further device, the outputted first signal having one or more of a first transmission signal power, a first bandwidth and a first center frequency, each of which is respectively lower than a second transmission signal power, a second bandwidth, and a second center frequency of a second signal output by the managing circuitry in a PLC mode.

11. The power line communication system according to claim 10,
wherein the system is a HiFi application system or any other system using one external power supply for multiple units, and
wherein the device and/or the at least one further device is one of a set-top box, a TV, a playstation, a HDD recorder, a radio receiver, a DVD player, a computer, a HiFi amplifier, a component of a HiFi rack, a timer unit, a power junction box, and an external power supply for multiple units.

12. The power line communication system according to claim 10, wherein the filter is configured to isolate a PLC network including the at least one further device from a mains grid supplying the external AC power.

13. The power line communication system according to claim 10,
wherein the device is a multiple extension power strip or a multi-outlet power strip, and
wherein the at least one further device is a set-top box, a playstation, a HDD recorder, a radio receiver, a computer, a TV, a CD player, a HiFi amplifier, a component of a HiFi rack, a timer unit, or an external power supply for multiple units.

14. The power line communication system according to claim 10, wherein the managing circuitry is configured to operate in the setup mode responsive to connection of the at least one further device to the at least one power socket, so as to establish the data communication with the at least one further device.

15. The power line communication system according to claim 10, wherein the managing circuitry is configured to continue operating in the setup mode when the managing circuitry detects that the at least one further device is not capable of PLC functionality.

16. The power line communication system according to claim 10, wherein the managing circuitry is configured to operate in the setup mode with respect to a first one of the at least one further device and to operate in the PLC mode with a second one of the at least one further device, at the same time.

17. The power line communication system according to claim 10,
wherein the device further includes a first switch configured to connect an output of the PLC modem to the at least one power socket in a first switching state thereof and to connect the output of the PLC modem to the power input in a second switching state thereof, and
wherein the PLC modem is not connected to the at least one power socket in the second switching state and is not connected to the power input in the first switching state.

18. A power line communication (PLC) method within a PLC network including a first device and at least one second device, the method comprising:
supplying an external AC power from a mains grid to the first device;
connecting said at least one second device to the first device;
establishing a data connection with the at least one second device, said establishing including outputting a first signal to the at least one second device, the outputted first signal having one or more of a first transmission signal power, a first bandwidth and a first center frequency, each of which is respectively lower than a second transmission signal power, a second bandwidth, and a second center frequency of a second signal output by the managing circuitry in a PLC mode;
detecting, using managing circuitry of the first device, whether the second device is capable of PLC communication; and
when the managing circuitry has detected that said at least one second device is capable of PLC functionality, enabling power line communication by isolating the PLC network from the mains grid by generating a filtered AC power within the first device using a filter configured to filter noise from the mains grid out of the external AC power, supplying the filtered AC power to the at least one second device and using the filtered AC power for power line communication within the PLC network; and
when the managing circuitry has detected that said at least one second device is not capable of PLC functionality, preventing any power line communication with said at least one second device.

19. The power line communication method according to claim 18, wherein said detecting is carried out each time the at least one second device is connected to the first device, or repeatedly, with predetermined repetition cycles.

20. The power line communication method according to claim 18, further comprising connecting an output of the PLC modem to the at least one power socket in a first switching state of a first switch, and connecting the output of the PLC modem to the power input in a second switching state of the first switch.

* * * * *